United States Patent [19]

Nakashima et al.

[11] Patent Number: 4,496,947

[45] Date of Patent: Jan. 29, 1985

[54] FUNCTION SWITCHING SYSTEM FOR AN AUDIO/VIDEO APPARATUS

[75] Inventors: Fujio Nakashima, Aichi; Takashi Enoki; Kazuto Nakashima, both of Toyokawa, all of Japan

[73] Assignee: Hitachi, Ltd., Tokyo, Japan

[21] Appl. No.: 368,045

[22] Filed: Apr. 14, 1982

[30] Foreign Application Priority Data

Apr. 20, 1981 [JP] Japan .................................. 56-58535

[51] Int. Cl.³ .............................................. H04Q 3/00
[52] U.S. Cl. .............................. 340/825.24; 358/194.1
[58] Field of Search ...................... 340/825.24, 825.25; 358/194.1

[56] References Cited

U.S. PATENT DOCUMENTS 4,217,573 8/1980 Norris .............................. 340/825.25
4,274,082 6/1981 Litz et al. ......................... 340/825.25

Primary Examiner—Donald J. Yusko
Attorney, Agent, or Firm—Antonelli, Terry & Wands

[57] ABSTRACT

In an audio recording and reproducing system comprising a combination of audio units including a record player, a tuner and a tape deck and an amplifier unit including a preamplifier, a function switching system comprises a control unit arranged in the amplifier unit including a signal selection circuit for selecting out one of outputs of the audio units to a speaker, a control circuit for controlling the signal selection circuit and function switches for supplying function selection signals to the control circuit, and control signal lines for coupling the control circuit of the control unit to the audio units. The signal selection circuit responds to the actuation of a start switch of the audio unit to assume the selected function mode through the control signal line and the control circuit and responds to the actuation of a function switch of the control unit to assume the selected function mode. One of the audio units is activated (to start play) and the other units are deactivated (to stop play) through the control signal lines. The functions of the audio units and the control unit can be switched from either one of the units.

7 Claims, 3 Drawing Figures

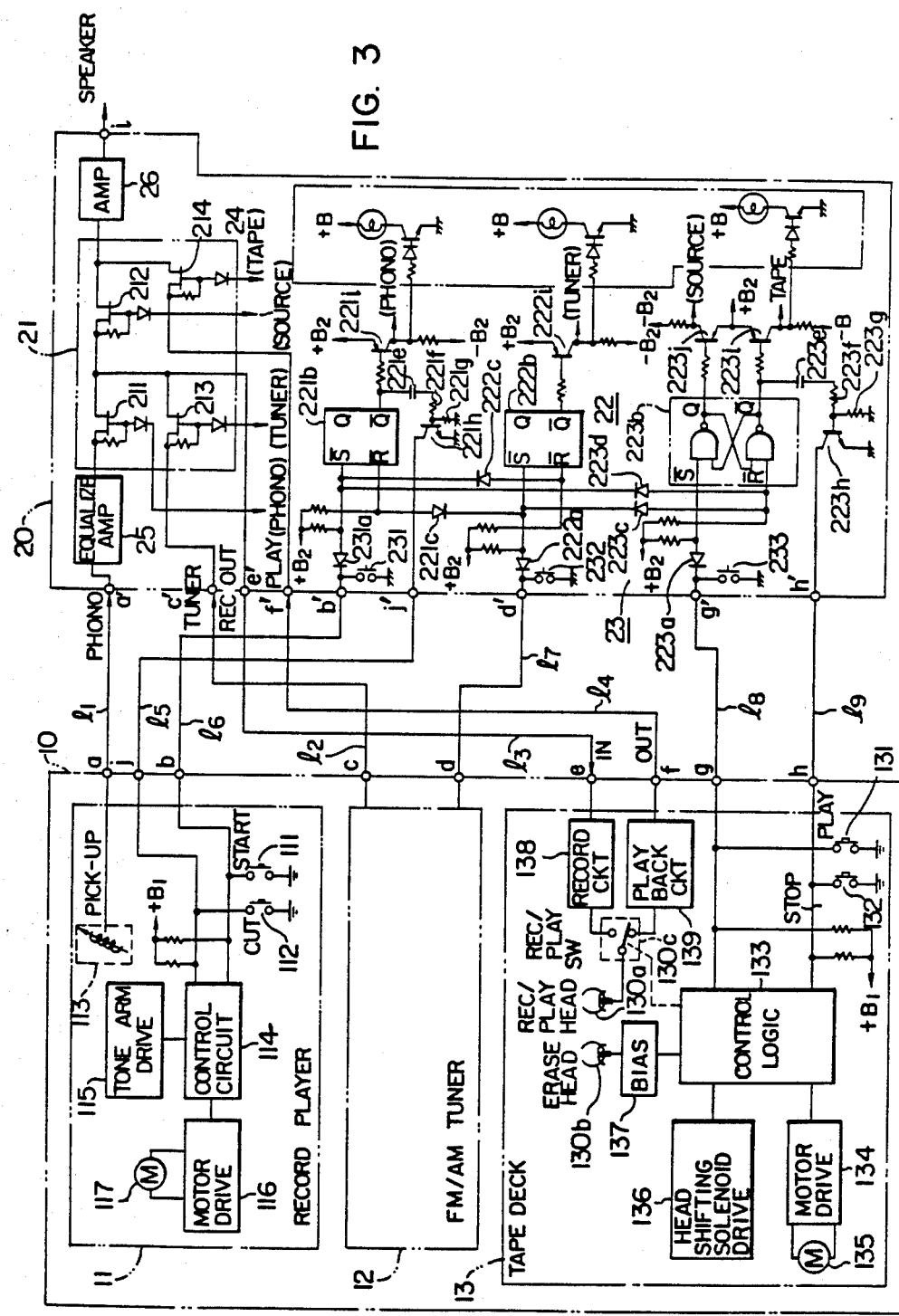

FUNCTION SWITCHING SYSTEM FOR AN AUDIO/VIDEO APPARATUS

BACKGROUND OF THE INVENTION

1. Field of the Invention

The present invention relates to a function switching system for an audio/video apparatus, and more particularly to an operation mode selection system or a function selection system in an audio recording and reproducing apparatus having discrete external equipment such as a record player, an FM/AM tuner and a tape deck, and an amplifier unit independent from the external equipment for amplifying an audio signal from the external equipment to supply the amplified signal to a speaker.

2. Description of the Prior Art

In such an audio system, each audio unit has buttons to start and stop the operation and the amplifier unit has a signal selection circuit for selectively supplying the audio outputs of the audio units to the speaker and a control circuit including a function switch to control the signal selection circuit. Usually, when it is desired to play a record by a record player, the function switch of the amplifier unit is switched to a PHONO mode and the start button of the record player is depressed.

In this case, the function switch of the amplifier unit and the start button of the record player must be manipulated, that is, at least two manipulations are required.

If the amplifier unit and the record player are installed at distant places, the manipulations of those switches are troublesome and inconvenient.

SUMMARY OF THE INVENTION

It is an object of the present invention to provide a function switching system which can switch functions such as start and stop functions and select a signal from either an external unit or a control unit by one manipulation with a simple construction.

In accordance with the present invention, audio/video equipment and other equipment separate from the audio/video equipment having signal selection (function switching) means for selecting the outputs of the audio/video equipment are connected by a signal transmission cord and a control signal cord, and the signal of the separate equipment is selected by the play start operation of the audio/video equipment through the control signal cord and the audio/video equipment is started for play by the manipulation of the function switch of the separate equipment.

According to the present invention, the functions of the external equipment and the function of the other equipment such as amplifier equipment can be selected by either one of the function switches in the external equipment or the other equipment, without requiring any special control signal transmitting/receiving circuit.

BRIEF DESCRIPTION OF THE DRAWINGS

FIG. 3 shows a circuit diagram of another embodiment of the present invention.

DESCRIPTION OF THE PREFERRED EMBODIMENTS

Prior to the present invention, the applicant of the present invention has proposed a system comprising an amplifier unit including a control unit for controlling functions in accordance with a function specifying signal from a remote control transmitter, in which the function specifying signals of audio units are transmitted to the control unit through remote control signal cords connecting the audio units with the control unit to select the function of the control unit.

Such a system has an advantage that the respective audio units can control the function of the control unit with simple manipulation.

This is true only for the control from the respective audio units to the control unit, and the control from the control unit to the audio units still needs two manipulations as is required in the prior art.

When the audio unit, for example, a tape deck is to be controlled from the control unit, the function specifying signal from the remote control transmitter is sent to the tape deck through the remote control signal cord to cause the tape deck to assume the mode corresponding to the function specifying signal, and a tape selecting function switch on the control unit is also actuated to control a source select switch and a tape/source switch of the control unit to select the audio output signal from the tape deck.

The present invention overcomes the above difficulty.

Figure 1:
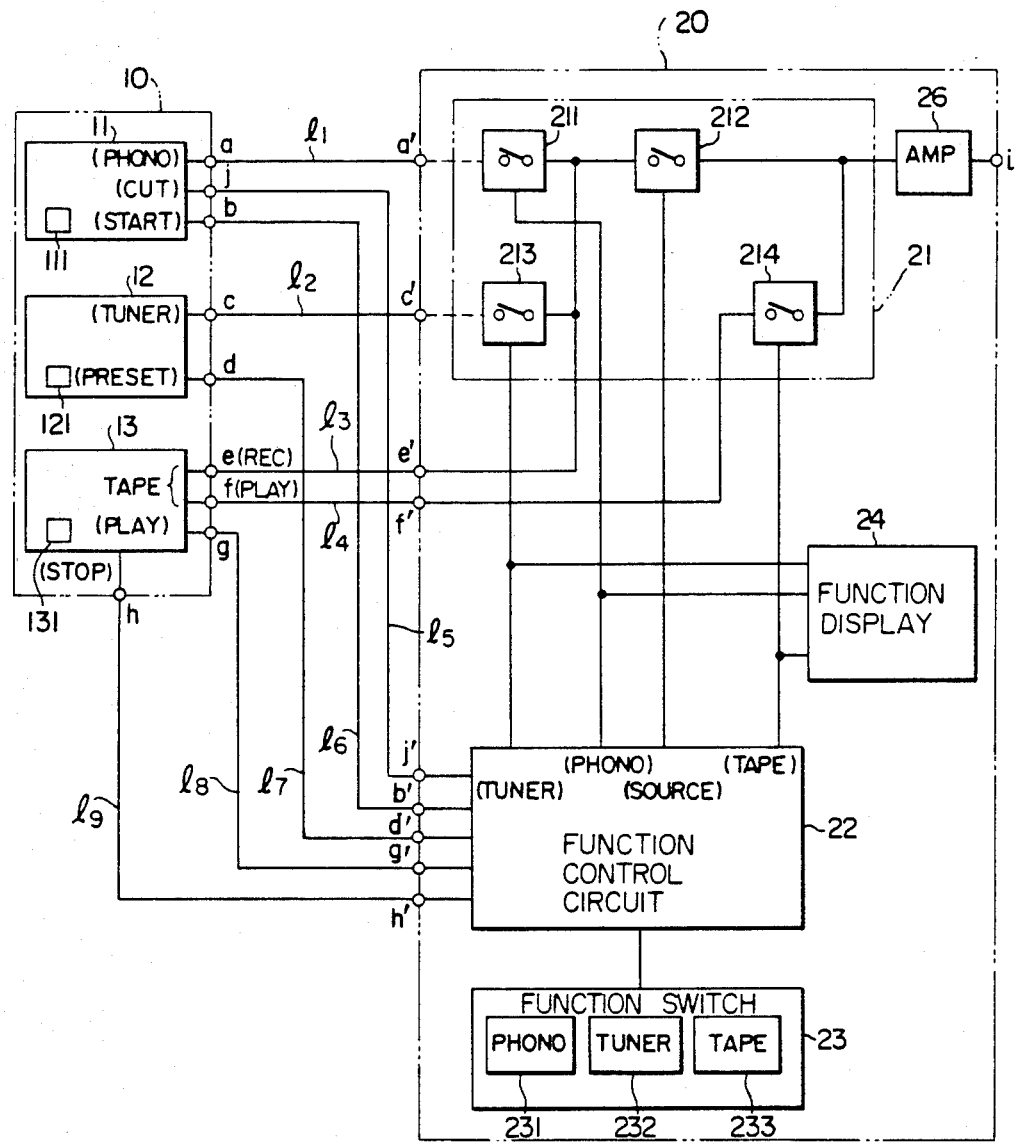
FIG. 1 shows a block diagram of one embodiment of the present invention.
Figure 2:
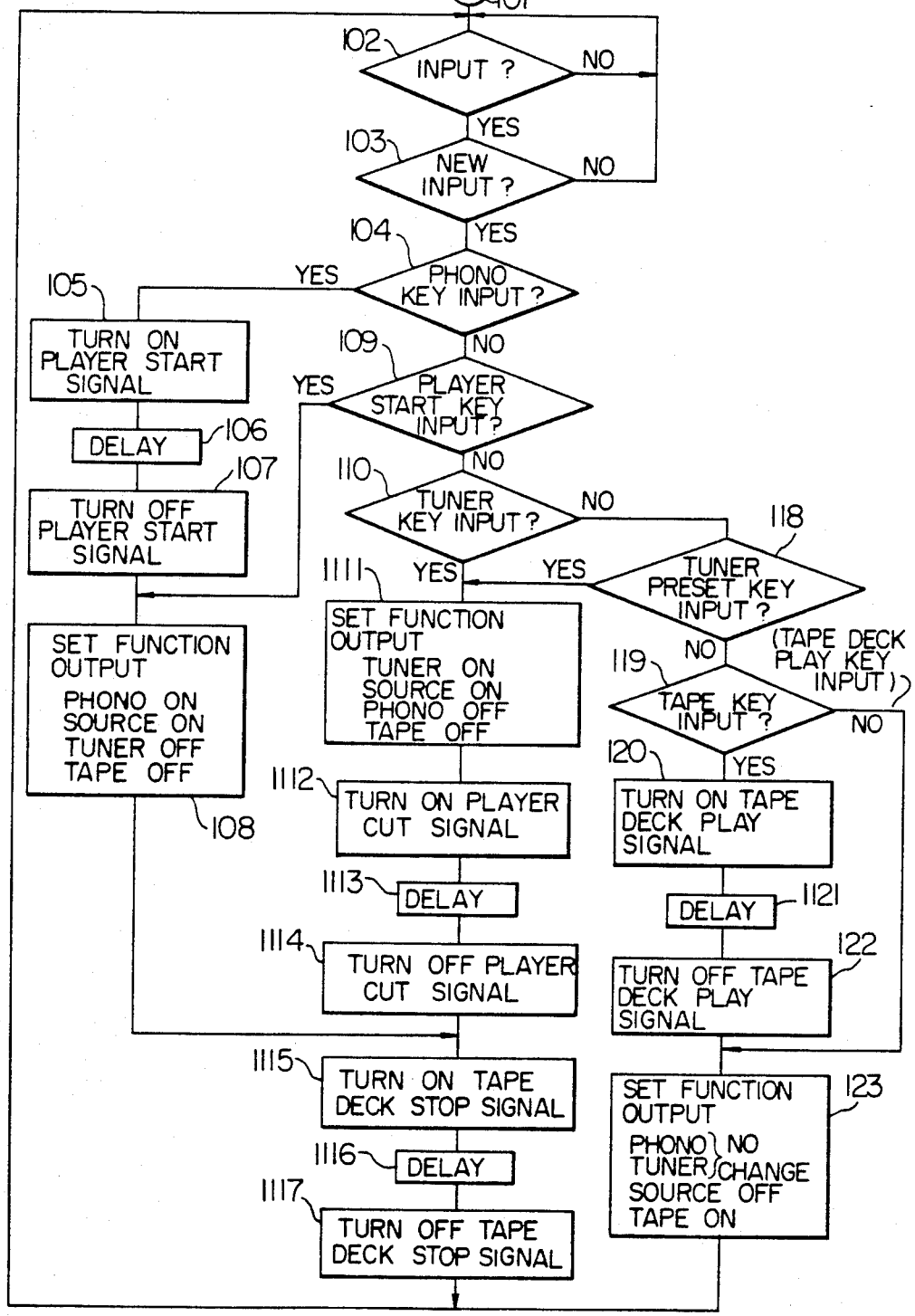
FIG. 2 shows a flow chart for explaining the operation of the present invention.

FIG. 1 shows a block diagram of one embodiment of the present invention. In FIG. 1, numeral 10 denotes external equipments which include audio/video units such as a record player 11, a tuner 12 and a tape deck 13. Numeral 20 denotes an amplifier unit which includes an amplifier 26 for amplifying output signals of the external equipments 10, and a control unit comprising a function signal selection circuit or a function (input) switching circuit 21, a function control circuit 22, a function switch 22 and a function display circuit 24. The function control circuit 22 may be a microcomputer controlled by a program as shown in FIG. 2. The external units 11, 12 and 13 and the amplifier unit 20 are interconnected via signal transmission cords $l_1$–$l_4$ and function control signal cords $l_5$–$l_9$.

The operation of the circuit of FIG. 1 is now explained with reference to a flow chart of FIG. 2. In the circuit of FIG. 1:

(1) When a PHONO button 231 of the function switch 23 is turned on, the microcomputer 22 operates in a loop of 102→103→104→105→106→107→108→1115→1116→1117→102 and a signal to start the record player unit 11 is produced in the steps 105, 106 and 107. This signal is supplied from a terminal b of the microcomputer 22 to a START terminal b of the record player unit 11 via the cord $l_6$ so that the record player unit 11 starts to play a record. In the step 108, a function control signal to control the function (input) switching circuit 21 is issued to turn on switches 211 and 212 and turn off switches 213 and 214. As a result, the function is assigned to the record player unit 11 so that a record player signal produced at a PHONO terminal a of the record player unit 11 is transmitted to an output terminal i through the signal transmission cord $l_1$, an input terminal a' of the amplifier unit 20 and the switches 211 and 212. In the steps 1115, 1116 and 1117, a tape deck stop signal for releasing the play of the tape deck unit 13 is produced. This signal is supplied from a terminal h' of the microcomputer 22 to a STOP terminal h of the tape deck unit 13 via the cord l₉ so that the tape deck unit 13 is changed from a tape play mode or other mode such as record mode or remind mode to a stop mode.

(2) When a START button 111 of the record player 11 is turned on, the record player unit 11 assumes a record play mode and a signal such as a music signal is produced at a PHONO terminal a. A microcomputer control signal is supplied to the START terminal b of the record player unit 11 and it is supplied to the microcomputer 22 of the amplifier unit 20 through the terminals b and b'. Thus, the microcomputer 22 operates in a loop of 102→103→104→109→108→1115→1116→1117→102. Unlike the case where the PHONO button 231 is turned on in the previous case (1), the play of the record is started by the START button 111 of the player unit 11 and hence a record player start signal need not be produced. Accordingly, the steps 105, 106 and 107 are not necessary. The other steps are identical to those of the case (1).

(3) When a TUNER button 232 of the function switch 23 is turned on, the microcomputer 22 operates in a loop of 102→103→104→109→110→1111→1112→1113→1114→1115→1116→1117→102. In the step 111, the tuner unit 12 is turned on and a control signal to control the function (input) switching circuit 21 to turn on the switches 213 and 212 and turn off the other switches is produced so that only the tuner signal is selected out to the output terminal i of the function (input) switching circuit 21.

In the steps 1112, 1113 and 1114, a cut signal for releasing the play of the record player unit 11 is produced. This signal is supplied from a terminal j' of the microcomputer 22 to a CUT terminal j of the player unit 11 through the cord l₅ so that the record player unit 11 assumes a record play release mode. In the steps 1115, 1116 and 1117, the tape deck unit 13 also assumes the play release mode as explained in the case (1).

(4) When a PRESET button 121 of the tuner unit 12 is turned on, the tuner unit 12 selects a station corresponding to the PRESET button and a received signal is produced at a TUNER terminal c and transmitted to a terminal c' of the amplifier unit 20. A microcomputer control signal is produced at a PRESET terminal d of the tuner unit 12 and it is supplied to the microcomputer 22 of the amplifier unit 20 through the terminals d and d'. Thus, the microcomputer 22 operates in a loop of 102→103→104→109→110→118→1111→1112→1113→1114→1115→1116→1117→102. Those steps are processed in a similar manner to the case (3).

(5) When a TAPE button 233 of the function switch 23 is turned on, the microcomputer 22 operates in a loop of 102→103→104→109→118→119→120→1121→122→123→102. In the steps 102, 1121 and 122, a play signal for causing the tape deck unit 13 to assume a play mode is produced. This signal is supplied from a terminal g' of the microcomputer 22 to a PLAY terminal g of the tape deck unit 13 through the cord l₈ so that the tape deck unit 13 starts the play of the tape. In the step 123, a function control signal to control the function (input) switching circuit 21 to turn on the switch 214 and turn off the switch 212 is produced so that the tape play signal is selected out to the output terminal i of the function (input) switching circuit 21. The switches 211 and 213 hold the previous states so that a player/tuner signal is transmitted to a REC terminal e of the tape deck unit 13 through a terminal e' to enable recording.

(6) When a PLAY button 131 of the tape deck unit 13 is turned on, the tape deck unit 13 starts to play the tape and the tape signal is supplied from a PLAY terminal f to the amplifier unit 20 through a terminal f'. A microcomputer control signal is produced at the PLAY terminal g of the tape deck unit 13 and it is supplied to the microcomputer 22 of the amplifier unit 20 through the terminal g'. Thus, the microcomputer 22 operates in a loop of 102→103→104→109→118→119→123→102. The difference from the case (5) is that the tape deck unit 13 starts to play the tape when the PLAY button 131 is turned on and hence the steps 120, 1121 and 122 for producing the tape deck play signal are not necessary. The step 123 is same as that in the case (5).

(7) When the TUNER button is turned on while the TAPE button is on:

Let us assume that the tape deck unit 13 is playing the tape and the function of the amplifier unit 20 is tape on and phono on. Thus, the switches 211 and 214 of the function (input) switching circuit 21 are on and the switches 212 and 213 are off and the tape signal is produced at the output terminal i of the amplifier unit 20.

Under such a condition, when the PRESET button 121 of the tuner unit 12 is turned on, the tuner unit 12 selects a station in accordance with the depressed button and a received signal is supplied from the terminal c to the amplifier unit 20 through the terminal c'. On the other hand, the on signal of the PRESET button 121 is supplied from the terminal d to the microcomputer 22 of the amplifier unit 20 through the terminal d'. Thus, the steps as described in the case (4) are carried out. The record player unit 11 and the tape deck unit 13 are released from the play modes and the switches 213 and 212 of the function (input) switching circuit 21 are turned on while the switches 211 and 214 are turned off so that the tuner signal is selected out to the output terminal i.

As described above, when the function switch 23 of the amplifier unit 20 is actuated or when the START button 111 or the PRESET button 121 of the external equipments 10 is actuated to start the play, the play of the source unit is started and the source signal is selected out to the output terminal i of the function (input) switching circuit 21 of the amplifier unit 20. Thus, by connecting a speaker to the output terminal i, the source signal such as music can be reproduced.

FIG. 3 shows a circuit diagram of other embodiments of the present invention, and Table 1 shows an operation of an R-S flip-flop, in which L represents a low level, H represents a high level and * indicates that a previous state is retained.

TABLE 1

| Input | | Output | |
| --- | --- | --- | --- |
| S | R | Q | Q |
| L | L | H | H |
| L | H | H | L |
| H | L | L | H |
| H | H | Q* | Q* |

Referring to FIG. 3, the record player unit 11 comprises a pickup 113, the START button 111, the CUT button 112, a playback control logic circuit 114 (e.g. Hitachi microcomputer HMCS-44), a drive circuit 116 for a turn table drive motor 117 and a tone arm drive circuit 115. The control logic circuit 114 includes a logic circuit and operates in response to an operation control signal from the START/CUT buttons 111, 112 or the control unit.

The FM/AM tuner unit 12 comprises a tuner and detector circuit for tuning and detecting a radio signal received by an antenna, station selection buttons, a station selection control circuit and a detected signal amplifier. It can select a station remotely from the tuner unit 12 via the remote control wires $l_2$ and $l_7$.

The tape deck unit 13 comprises a recording circuit 138, a playback circuit 139, the tape PLAY button 131, the STOP button 132, a FAST FORWARD button, a RECORD button, a PAUSE button, a REWIND button, a control logic circuit 133 (e.g. NEC microcomputer μPD-554C), a tape drive motor 135, a motor drive circuit 134, a record/playback head 130a, an erase head 130b, a record/playback switching circuit 130c, a bias circuit 137, and a head movement and tape transport direction switching solenoid and solenoid drive circuit 136. The other like elements to those shown in FIG. 1 are designated by the like numerals, and they are not explained here.

In such a circuit, when the PLAY button 131 of the tape deck unit 13 is turned on, a lower level signal is supplied to the control logic circuit 133, which controls the motor drive circuit 134 in a known manner to drive the motor 135 and drive the tape movement and tape travel direction switching solenoid circuit to switch the record/playback switch to a proper position to establish the play mode. At this time, an $\overline{S}$ terminal of the flip-flop 223b of the control unit 22 assumes a low level and the output Q thereof assumes a high level while the output $\overline{Q}$ assumes a low level. As a result, a transistor 223J is turned off and a transistor 223i is turned on. Thus, the switch 212 of the function (input) switching circuit 21 is turned off and the switch 214 is turned on so that the audio output of the tape deck unit 13 is supplied to the output terminal i through the line $l_4$, the switch 214 and the amplifier 26.

Let us assume that the tape deck unit 13 is playing the tape and the tape/source function switch 214 of the amplifier unit 20 is in the TAPE mode and the source select switches 211, 212 and 213 are selecting the PHONO mode. At this time, the switches 211 and 214 of the function (input) switching circuit 21 are on while the switches 212 and 213 are off to select out the tape play signal to the output terminal i of the amplifier unit 20.

Under this condition, when the TUNER button 232 is turned on, a set signal is applied to the flip-flop 222b so that the Q output of the flip-flop 222b assumes the high level and the $\overline{Q}$ output assumes the low level. As a result, a transistor 222i is turned on and a collector potential thereof reaches substantially +B₂ and the switch 213 of the function (input) switching circuit 21 is turned on.

On the other hand, an $\overline{R}$ terminal of the flip-flop 221b assumes the low level through a diode 221C and hence the Q output of the flip-flop 221b assumes the low level while the $\overline{Q}$ output assumes the high level. As a result, the transistor 221i is turned off and the collector potential thereof reaches —B₂. Thus, the switch 211 of the function (input) switching circuit 21 is turned off. Since the $\overline{Q}$ output changes from the low level to the high level, a transistor 221h is turned on for a predetermined time period through a capacitor 221e. (The turn-on time period is determined by the capacitor 221e and resistors 221f and 221g.) This signal is transmitted from the amplifier unit 20 to the record player unit 11 through the terminals j and j' to release the record play mode. Since an $\overline{R}$ input terminal of a flip-flop 223b assumes the low level through a diode 223c, the Q output of the flip-flop 223b assumes the low level and the $\overline{Q}$ output assumes the high level. As a result, a transistor 223j is turned on and a transistor 223i is turned off, and the switch 212 of the function (input) switching circuit 21 is turned on and the switch 214 is turned off. Since the $\overline{Q}$ output changes from the low level to the high level, a transistor 223h is turned on for a predetermined time period through a capacitor 223e. (The turn-on period is determined by the capacitor 223e and resistors 223f and 223g.) This signal is transmitted from the amplifier unit 20 to the tape deck unit 13 through the terminals h' and h to release the tape play mode of the tape deck unit 13.

As a result, in the function (input) switching circuit 21, the switches 213 and 212 are turned on and the switches 211 and 214 are turned off and only the tuner signal is selected out to the output terminal i of the amplifier unit 20. The equipment (the record player unit 11 and the tape deck unit 13) which is not selected by the function (input) switching circuit 21 can be released from their play modes. Let us now assume that the TAPE button 233 is turned on under this condition. When the button 233 is turned on, the $\overline{S}$ terminal of the flip-flop 223b assumes the low level and the Q output thereof assumes the high level and the $\overline{Q}$ output assumes the low level. As a result, the transistor 223j is turned off and the transistor 223i is turned on. Accordingly, the switch 212 of the function (input) switching circuit 21 is turned off and the switch 214 is turned on so that the tape play signal is selected out to the output terminal i of the function (input) switching circuit 21. On the other hand, the turn-on signal of the TAPE button 233 is transmitted to the tape deck unit 13 through the terminals g' and g. As a result, the input terminal to the logic circuit 134 assumes the low level resulting in an equivalent state to the turn-on of the PLAY button 131 in the tape deck unit 13. Thus, the tape deck unit 13 starts to play the tape. As a result, the tape play signal is selected out to the output terminal i of the function (input) switching circuit 21. It is apparent that the same operation is carried out when the PLAY button 131 in the tape deck unit 13 instead of the TAPE button 233 is turned on.

In FIG. 3, when the positive power supply (+B₂) of the amplifier unit 20 and the positive power supply (+B₁) of the tape deck unit 13 substantially differ from each other, a current would flow from the higher voltage power supply to the lower voltage power supply and the level at the input terminal of the flip-flop 223b or the logic circuit 133 would not be maintained at the proper high level or the input level would exceed a breakdown voltage of the input terminal, if the diodes 132 and 223a are not inserted. The diodes 132 and 223a are, therefore, inserted to prevent the above problems. In addition, if those diodes are not inserted, when one of the power supplies of the amplifier unit 20 and the tape deck unit 13 is off and the other is on, the positive power supply terminal of the unit having the turn-off power supply is at the low level and a current would flow from the unit having the turn-on power supply to the unit having the turn-off power supply through the terminals g and g' so that the level at the input terminal of the flip-flop 223b or the logic circuit 133 would change resulting in a malfunction. The diodes 132 and 223a are inserted to prevent the above problem. The diodes 221a and 222a are also inserted for a similar purpose.

Those diodes may be eliminated in a system having no possibility of such problems (e.g. in a system in which the power supply of the external equipment 10 and the power supply of the amplifier unit 20 are synchronously turned on and off or a system having a buffer in a signal line).

Although the invention has been described in conjunction with audio equipment such as a record player 11, a tuner 12 and a tape deck 13, it is to be understood that it can also be used for corresponding audio/video equipment such as a video disc player, a television and a video tape recorder.

We claim:

1. A function switching system comprising:
   (a) control means including a selection circuit for selecting a signal from a plurality of signal sources and a control circuit therefore connected to said selection circuit;
   (b) an external unit separately arranged from said control means for supplying a signal to said control means to serve as at least one of said signal sources;
   (c) circuit means for coupling said external unit to said control means;
   (d) a first switching circuit arranged in said external unit for supplying a control signal to start the operation of said external unit to said external unit and said control circuit of said control means; and
   (e) a second switching circuit arranged in said control means for supplying a control signal to activate said control circuit of said control means to said control circuit and said external unit;
   whereby said external unit starts the operation by the control signal of either one of said first switching circuit or said second switching circuit and said selection circuit selects the signal from the signal source of said external unit.

2. A function switching system according to claim 1 wherein said circuit means includes a signal transmission line for connecting said external unit to said selection circuit of said control means to transmit a playback output of said external unit to said selection circuit and a control signal transmission line for connecting said external unit to said control circuit of said control means to transmit the control signals of said external unit and said control circuit.

3. A function switching system according to claim 1 wherein said selection circuit includes a switching circuit coupled to said external unit for selecting out a playback signal of said external unit to an output stage thereof, and said control circuit includes a microcomputer responsive to the control signal of said first and second switching circuit for producing a function control signal in accordance with said control signal, a first circuit for supplying the function control signal of said microcomputer to said switching circuit of said selection circuit to switch said switching circuit of said selection circuit to a mode corresponding to the function control signal, and a second circuit for supplying the function control signal of said microcomputer to said external unit to switch said external unit to a mode corresponding to the function control signal.

4. A function switching system according to claim 1 wherein said selection circuit includes a switching circuit coupled to said external unit for selecting out a playback signal of said external unit to an output stage thereof, and said control circuit includes a logic circuit responsive to the control signal of said first or second switching circuit for producing a function control signal in accordance with the control signal and a transistor circuit for supplying the function control signal of said logic circuit to said switching circuit of said selection circuit to switch said switching circuit of said selection circuit to a mode corresponding to the function control signal.

5. A function switching system comprising:
   (a) an external equipment including at least first and second audio units;
   (b) a control equipment including a selection circuit coupled to said first and second audio units of said external equipment for selecting one of playback signals from said first and second audio units as an input signal source, and a control circuit coupled to said first and second audio units of said external equipment and said selection circuit for producing first and second control signals to activate one of said first and second audio units and deactivate the other audio unit and a third control signal to control said selection circuit in response to function switching;
   (c) first and second function switching circuits arranged in said first and second audio units of said external equipment, respectively, for supplying fourth and fifth control signal to start the operations of the respective audio units to said first and second audio units, respectively, and said control circuit of said control equipment; and
   (d) a third function switching circuit arranged in said control equipment for supplying a sixth control signal to said control circuit to activate said control circuit and cause said control circuit to produce said first, second and third control signals;
   whereby one of said first and second audio units of said external equipment starts its operation and the other audio unit stops its operation in response to the control signals of said first, second and third function switching circuits and said selection circuit selects a playback signal of the activated one of said first and second audio units.

6. A function switching system according to claim 5 wherein said control circuit includes a microcomputer responsive to said fourth, fifth or sixth control signal of said first, second or third function switching circuit to produce said first, second or third control signal.

7. A function switching system comprising:
   (a) an external equipment including first and second audio/video units;
   (b) a control equipment including a function switching circuit coupled to said external equipment for selecting first or second audio/video signal from said first or second audio/video units and a control circuit coupled to said function switching circuit and said first and second audio/video units;
   said control circuit including first and second function switches and means responsive to the turn-on of said first or second function switch to activate said first or second audio/video unit and control said function switching circuit to select said first or second audio/video signal,
   said first and second audio/video units including third and fourth function switches, respectively, and means responsive to the turn-on of said third and fourth function switches, respectively, to activate said first and second audio/video units, respectively, and control said function switching circuit through said control circuit to select said first and second audio/video signals, respectively.

* * * * *